| United States Patent [19] | [11] Patent Number: 4,787,295 |
|---|---|
| Obermeier-Wagner et al. | [45] Date of Patent: Nov. 29, 1988 |

[54] PISTON FOR INTERNAL COMBUSTION ENGINES

[75] Inventors: Karl-Heinz Obermeier-Wagner; Edgar Martin, both of Nürnberg; Gerhard Böhm, Rosstal, all of Fed. Rep. of Germany

[73] Assignee: Alcan Deutschland GmbH, Fed. Rep. of Germany

[21] Appl. No.: 159,660

[22] Filed: Feb. 24, 1988

[30] Foreign Application Priority Data

Mar. 4, 1987 [DE] Fed. Rep. of Germany ....... 3706940

[51] Int. Cl.$^4$ ................................................. F16J 1/00
[52] U.S. Cl. ........................................ 92/158; 92/159; 92/172; 92/208; 92/261
[58] Field of Search ................ 92/158, 159, 181 R, 92/182, 172, 208, 261, 81; 29/156.5 R

[56] References Cited

U.S. PATENT DOCUMENTS

| 1,664,507 | 4/1928 | Hanch | 92/158 |
| 1,864,384 | 6/1932 | Ware | 92/158 |
| 2,407,440 | 9/1946 | Osborne | 92/159 |

Primary Examiner—Edward K. Look
Attorney, Agent, or Firm—Cooper & Dunham

[57] ABSTRACT

Piston for internal combustion engines, with an oil scraper ring disposed in an annular groove at the circumference of its head portion. The outer edge of the annular groove adjacent to the piston skirt which adjoins the head portion is bevelled to form a chamfer. In order to ensure the maintenance of an oil film sufficient to prevent dry running of the piston, on the cylinder wall, the width of the chamfer is greater on the thrust side of the piston. The width of the chamfer may decrease essentially continuously from the counter-thrust side to the pressure side.

7 Claims, 1 Drawing Sheet

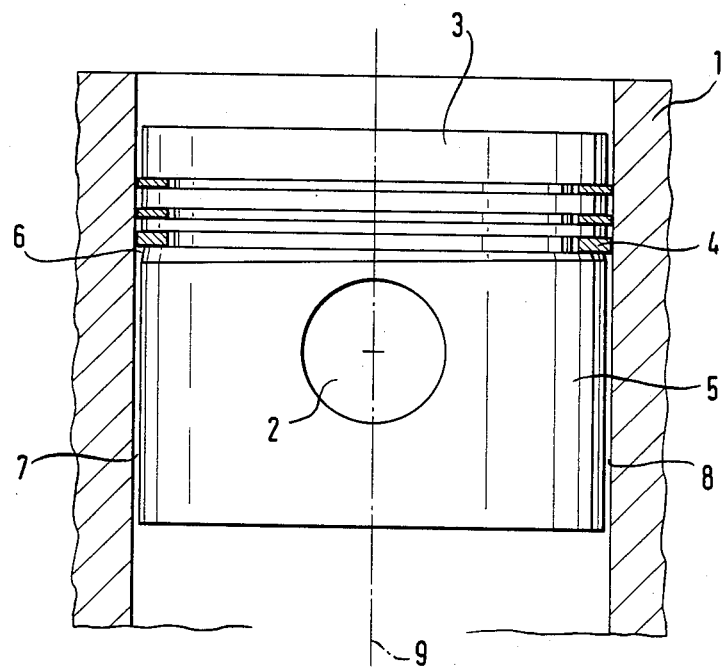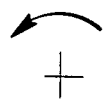

PISTON FOR INTERNAL COMBUSTION ENGINES

This invention concerns a piston for internal combustion engines, with an oil scraper ring disposed in an annular groove located at the periphery of its head portion, wherein the outer edge of the annular groove which is adjacent to the piston skirt adjoining the head portion of the piston, is bevelled off towards the piston skirt to form a chamfer.

With pistons, particularly pistons for internal combustion engines, there is the problem that a lack of lubricant on the piston running surfaces leads to dry running, which can lead to seizure phenomena on these running surfaces. It is particularly the counter-pressure side of the piston which is at risk from this, because during the power and/or induction stroke of the piston, in which it abuts against its thrust side, the piston rings on its counter-thrust side, projecting radially beyond the piston contour, seal resiliently against the cylinder wall of the engine and in the process to a large extent remove the oil film on the counter-thrust side. During the subsequent compression and/or exhaust stroke, the piston is then forced against the poorly lubricated cylinder wall surface of the counter-thrust side, and the oil film which has largely been removed can be penetrated, so that the above mentioned seizure phenomena can occur. The thrust side of the piston, on the other hand, is better supplied with oil because, due to oil movement in the engine as a result of rotation of the crankshaft, oil is preferentially thrown onto the cylinder wall adjacent the thrust side of the piston, and during the downward stroke the piston skirt always slides into a cylinder running surface which is well wetted with oil. In the upward stroke, however, the counter-thrust side of the piston abuts the cylinder wall which is freed from oil by the wiping action of the piston rings.

In order to produce an adequate oil film on the running surfaces of the piston or the adjacent cylinder wall, up to now the following measures have been provided:

(a) The roughness of the piston skirt surface finish has been increased and hence the bearing fraction of the piston skirt has been reduced. But this has the disadvantage that high wear occurs on the piston skirt due to rapid abrasion of the machined surface irregularities.

(b) The scraping action of the oil scraper rings has been reduced. But this leads to high oil consumption and hence high combustion of oil in the engine, with the consequence of the formation of carbon in the cylinder.

(c) Broad chamfers have been provided at the edges of the annular groove which holds the oil scraper ring, in order thus to obtain a space for an adequate oil reservoir between this chamfer and the opposed cylinder wall. But this reduces the bearing friction of the piston skirt, whereby its surface pressure is increased. This can result in penetration of the oil film on the thrust side of the piston and hence dry running of the piston.

It is therefore the object of the invention to design a piston of the kind mentioned hereinbefore in such a way that the above-mentioned disadvantages do not occur, i.e. the maintenance of an oil film sufficient to prevent dry running is ensured. According to the invention, this is achieved by the fact that with this piston the width of the chamfer at the outer edge adjacent to the piston skirt, of the annular groove which holds the oil scraper ring, is greater on the counter-thrust side of the piston than on the thrust side of the piston. As a result, a larger gap is formed between this chamfer and the adjacent cylinder wall on the counter-thrust side of the piston than on the thrust side of the piston, so that a larger oil reservoir forms on the counter-thrust side than on the thrust side. This larger oil reservoir can be selected by appropriate choice of the chamfer width, as a function of the stroke and diameter of the piston, in such a way that it is sufficient for adequate lubrication of the running surface of the piston and of the adjacent cylinder wall throughout the piston stroke. In this way, an accumulation of oil can be prevented as well as inadequate supply of oil. The effect of the smaller width of the chamfer on the pressure side of the piston is that flow of oil away from the counter-thrust side is prevented, whereby penetration of the oil film at the cylinder wall by the piston on its counter-thrust side is avoided. Sound damping becomes noticeable as a result, particularly when the engine is cold.

Due to the fact that the wide chamfer is not provided, as with the known state of the art, over the whole circumference of the piston, but only or basically only in the region of the counter-thrust side of the piston, where a larger oil reservoir is needed due to the pool oil supply, with the piston according to the invention on adequate oil film is ensured on its critical side, without the carrying region of the piston on the thrust side being significantly reduced with the consequence of increased surface pressure and the risk that the oil film will penetrate there.

Advantageous developments of the piston according to the invention are apparent from the subsidiary claims.

The drawing shows a particularly advantageous practical example of the piston according to the invention, the piston being shown in a cylinder 1 drawn in section, in a side view of a gudgeon pin bore 2. In its head portion 3 this piston has three annular grooves arranged one above the other, of which the top two each receive a compression ring and the bottom one receives an oil scraper ring 4. The outer edge of the bottom annular groove adjacent the piston skirt 5 is bevelled to form a chamfer 6. This chamfer is larger on the counter-thrust side 7 of the piston than on the thrust side 8 of the piston. The width of the chamfer decreases continuously from the counter-thrust side to the thrust side, its surface extending at an angle of approximately 10° to 30° to the piston axis 9. The width of the chamfer may also narrow in stages towards the thrust side, at a point between counter-thrust side and thrust side.

The thrust side and counter-thrust side are dependent on the direction of rotation of the crankshaft, which is shown by an arrow at the bottom in the drawing.

We claim:

1. Piston for internal combustion engines comprising an oil scraper ring disposed in an annular groove on the circumference of its head portion, the outer edge of the annular groove adjacent to the piston skirt which adjoins the head portion being bevelled to form a chamfer, wherein the width of the chamfer, which extends over the whole circumference of the piston, is larger on the counter-thrust side of the piston than on the thrust side of the piston.

2. Piston according to claim 1, wherein the width of the chamfer decreases essentially continuously from the counter-thrust side of the piston to the thrust side of the piston.

3. Piston according to claim 1, wherein the width of the chamfer narrows in stages towards the thrust side of the piston.

4. Piston according to claim 1, wherein the chamfer surface is at an angle of 10° to 30° to the piston axis.

5. Piston according to claim 1, wherein the tapered ring-shaped chamfer surface has a centre offset of 0.05 to 0.3 mm, preferably 0.15 to 0.2 mm, from the outer contour of the piston head portion.

6. Piston according to claim 1, wherein the ratio of the chamfer width on the counter-thrust side to the chamfer width on the thrust side is 1:2.4 to 1:12, preferably 1:5.

7. Piston according to claim 1, wherein the width of the chamfer is 0.5 to 2.5% of the piston diameter on the thrust side, and 1.5 to 6% on the counter-thrust side.

* * * * *